(12) United States Patent
Chang et al.

(10) Patent No.: US 6,442,710 B1
(45) Date of Patent: Aug. 27, 2002

(54) PC INTERVAL TIMER TEST METHOD

(75) Inventors: Vam Chang; Kuang-Shin Lin, both of Taipei (TW); Kingboard Ma; Xian-Hong Shen, both of Tientsin (CN)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/371,000

(22) Filed: Aug. 10, 1999

(30) Foreign Application Priority Data

May 17, 1999 (TW) ........................................ 88107950 A

(51) Int. Cl.[7] .............................................. G08C 25/00
(52) U.S. Cl. ............................. 714/34; 714/40; 714/47
(58) Field of Search ............................. 714/25, 34, 47, 714/48, 55; 712/200; 710/260; 702/186

(56) References Cited

U.S. PATENT DOCUMENTS 4,896,321 A * 1/1990 Kawahara .................. 371/16.1
5,944,840 A * 8/1999 Lever ......................... 714/34

* cited by examiner

*Primary Examiner*—Robert Beausoleil
*Assistant Examiner*—Marc Duncan
(74) *Attorney, Agent, or Firm*—Bacon & Thomas

(57) ABSTRACT

A PC interval timer test method used in a personal computer to test the abnormality of the interval timer of a PC (personal computer) by: calculating the difference between the periodic interrupt frequency of the PC's CMOS Real Time Clock (R.T.C.) and the interval timer interrupt frequency within the same time period, and then judging the result by comparing the value of the difference thus obtained with the set maximum allowable value of error of the CMOS R.T.C.'s periodic interrupt frequency. The maximum frequency of the CMOS R.T.C. can be as high as 8192 Hz, so that the test error can be as minor as below 1/8192.

4 Claims, 2 Drawing Sheets

PC INTERVAL TIMER TEST METHOD

BACKGROUND OF THE INVENTION

The present invention relates to a method of testing the abnormality of the interval timer of a personal computer, and more particularly to such a PC (personal computer) interval timer test method, which achieves the test by comparing the periodic interrupt frequency of the PC's CMOS R.T.C (Real Time Clock) with the interrupt frequency of the PC's interval timer within the same time period.

Conventionally inspecting the abnormality of the interval timer of a PC is achieved simply by comparing the PC's interval timer with its internal CMOS R.T.C. The precision of this test method can reach only the unit of seconds. There is another interval timer test method of testing the abnormality of the interval timer of a PC by using an oscilloscope. However, when an oscilloscope is used, the casing of the computer to be tested must be removed. Therefore, this interval timer test method is complicated.

SUMMARY OF THE INVENTION

It is one object of the present invention to provide a PC interval timer test method, which achieves high precision. It is another object of the present invention to provide a PC interval timer test method, which enables the test to be run without removing the casing of the computer. According to the present invention, the test is achieved by: calculating the difference between the periodic interrupt frequency of the PC's CMOS Real Timer Clock with the interval timer interrupt frequency within the same time period, and then judging the result by comparing the value of the difference thus obtained with the set maximum allowable value of error of the CMOS R.T.C's periodic interrupt frequency. Because the maximum frequency of a CMOS RealTime Clock can be as high as 8192 Hz, the test error can be as minor as below 1/8192.

DETAILED DESCRIPTION OF THE PREFERRED EMBODIMENT

Figure 1:
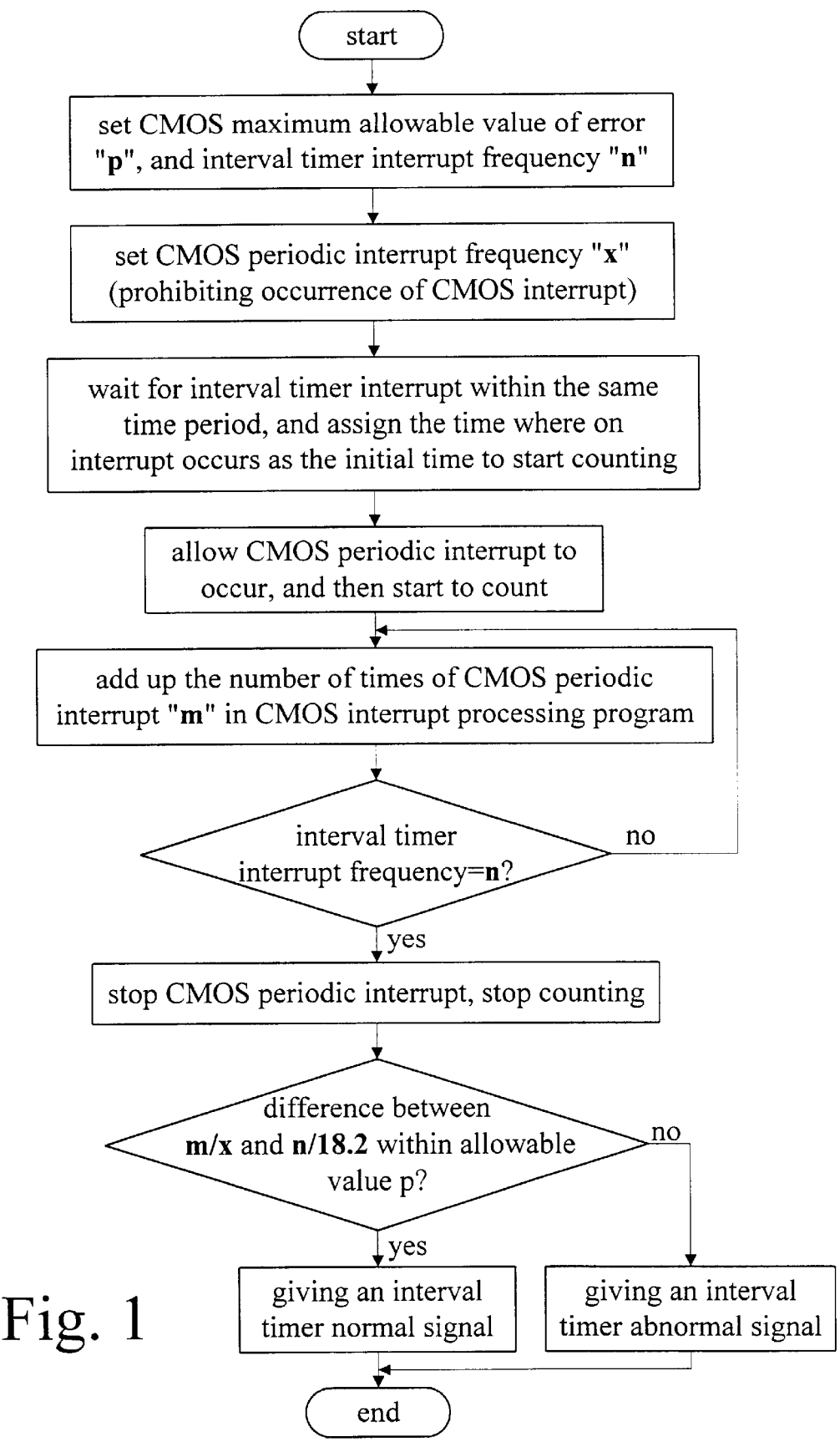
FIG. 1 is a test flow chart of a PC interval timer test method according to the present invention.

Referring to FIG. 1, the PC interval timer test method of the present invention is designed for use in an IBM PC compatible personal computer to test the interval timer. The interval timer of an IBM PC (personal computer) compatible personal computer interrupts once every 55 ms (a frequency of 18.2 Hz). On the other hand, the periodic interrupt frequency of the computer's internal CMOS (Complementary MetalOxide Semiconductor) R.T.C. (Real Time Clock) can be set by the user, and the maximum frequency can be as high as 8192 Hz, i.e., 8192 interrupts can occur per every second.

The PC interval timer test method achieves the test by comparing the CMOS R.T.C's periodic interrupt with the number of interrupts in the interval timer of the PC within the same time period. Because the frequency of periodic interrupt of the PC's CMOS R.T.C can be as high as 8192 Hz, test error can be minimized to below 1/8192 second. Therefore, the accuracy of the PC's interval timer can be accurately tested by means of using the CMOS R.T.C's periodic interrupt.

The PC interval timer test method comprises the steps of:

1. setting the maximum allowable value of error of the CMOS R.T.C's periodic interrupt frequency at "p" seconds (the maximum allowable value of error of the CMOS R.T.C's periodic interrupt can be as high as 1/8192 second), and setting the total number interrupts by the interval timer to be measured at "n";
2. setting the CMOS periodic interrupt frequency at "x" (at this time, CMOS interrupt is prohibited);
3. waiting for the interval timer interrupt within the same time period, and assigning the time when one interrupt occurs as the initial time to start counting;
4. allowing a CMOS periodic interrupt to occur, and then starting to count;
5. adding up the number of CMOS periodic interrupts "m" in the CMOS interrupt processing program;
6. judging if the number of interval timer interrupts reaches the set value "n", then proceeding to the following step 7 if positive, or returning to step 5 if negative;
7. prohibiting occurrence of the CMOS periodic interrupt, and stopping the counting;
8. calculating the difference between the result obtained by dividing the number of CMOS periodic interrupts "m" by the set CMOS periodic interrupt frequency "x"(i.e., m/x), and the result obtained by dividing the total number of interrupts by the interval timer "n" by the original interval timer frequency 18.2 Hz (i.e., n/18.2), and then proceeding to the following step 9 if the value of the difference is within the set maximum allowable value of error of CMOS R.T.C's periodic interrupt frequency "p", or giving an interval timer abnormal signal and then proceeding to the following step 10, if the value of the difference is beyond the set maximum allowable value of error of CMOS R.T.C's periodic interrupt frequency "p";
9. giving an interval timer normal signal;
10. ending the test.

Figure 2:
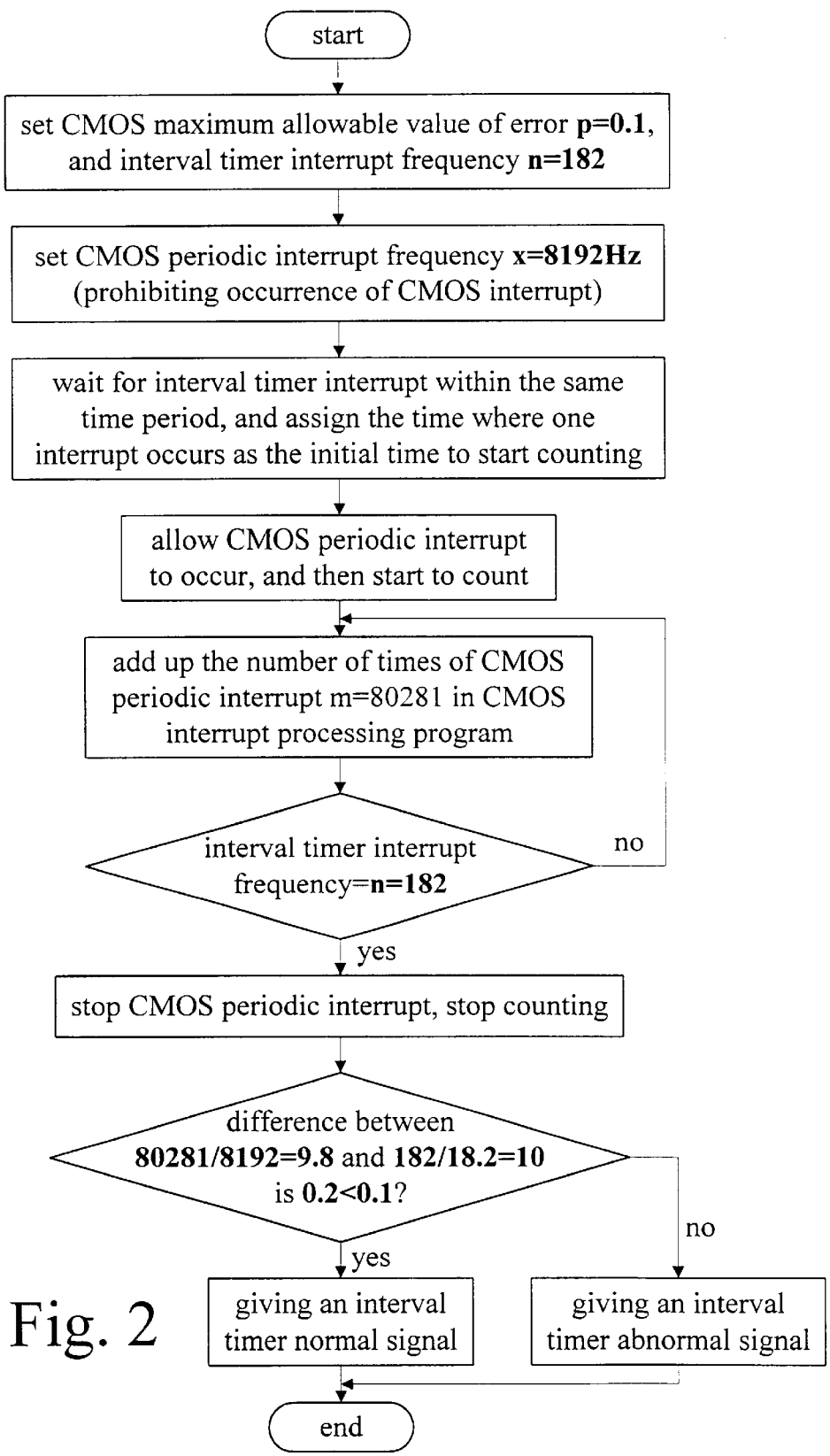
FIG. 2 is a test flow chart showing an example of the present invention.

FIG. 2 shows an example of the present invention.

According to this example, the PC interval timer test method is carried out as follows:

1. setting the maximum allowable value of error of CMOS R.T.C's periodic interrupt at P=0.1, second, and the total number of interrupts by the interval timer to be measured at n=182, (i.e., a total test period of 182/18.2=10, seconds);
2. setting the CMOS periodic interrupt frequency at x=8192 Hz (at this time CMOS interrupt is prohibited);
3. waiting for the interval timer interrupt within the same time period, and assigning the time when one interrupt occurs as the initial time to start counting;
4. allowing the CMOS periodic interrupt to occur, and then starting to count;
5. adding up the number of CMOS periodic interrupts (for example, m=80281) in the CMOS interrupt processing program;
6. judging if the number of interval timer interrupts reaches the set value n=182, then proceeding to the following step 7 if positive, or returning to step 5 if negative;
7. prohibiting occurrence of the CMOS periodic interrupt, and stopping the counting;
8. calculating the difference between the result obtained by dividing the number of CMOS periodic interrupts m=80281 by the set CMOS periodic interrupt frequency P, x=8192 Hz (i.e., 80281/8192), and the result obtained by dividing the total number of interrupts by the interval timer n=182 by original interval timer interrupt 18.2, Hz (i.e., 182/18.2=10), and then proceeding to the following step 9 if the value of the difference is within the set maximum allowable value of error of CMOS R.T.C's periodic interrupt frequency p=0.1, or giving an interval timer abnormal signal and then proceeding to the following step 10, if the value of the difference is beyond the set maximum allowable value of error of CMOS R.T.C's periodic interrupt frequency p=0.1, 9. giving an interval timer normal signal;

10. ending the test.

According to the aforesaid example, the value of the difference obtained at step 8 is 0.2, second (which is beyond the set maximum allowable value of error of CMOS R.T.C's periodic interrupt p=0.1). Therefore, the method gives an interval timer abnormal signal, and skips step 9, and then directly proceeds to step 10.

By means of setting the maximum allowable value of error of CMOS R.T.C's periodic interrupt below 1/8192, second, a high precision test can be achieved. According to the present invention, it is not necessary to remove the casing of the PC when running the test.

It is to be understood that the drawings are designed for purposes of illustration only, and are not intended as a definition of the limits and scope of the invention disclosed.

What the invention claimed is:

1. A PC interval timer test method for use in a personal computer to test abnormality of an interval timer of the personal computer, the test method comprising the steps of:

(a) setting a maximum allowable error value for a periodic interrupt frequency of the personal computer's CMOS real time clock (R.T.C.) at "p" seconds, and setting a total number of interrupts by the interval time to be measured at "n";

(b) setting a CMOS periodic interrupt frequency "x", and prohibiting occurrence of a CMOS periodic interrupt at this time;

(c) waiting for an interval timer interrupt to occur while occurrence of the CMOS periodic interrupt is prohibited, and assigning a time when one interrupt occurs as an initial time to start counting;

(d) allowing the CMOS periodic interrupt to occur, and then starting to count CMOS periodic interrupts and interval timer interrupts;

(e) adding up a number of times "m" the CMOS periodic interrupt is detected by a CMOS periodic interrupt processing program;

(f) judging if a number of interval timer interrupts reaches the set value "n", then proceeding to the following step (g) if positive, or returning to step (e) if negative;

(g) prohibiting occurrence of the CMOS periodic interrupt, and stopping the counting;

(h) calculating the difference between the number of CMOS periodic interrupts and the number of interval timer interrupts, and then proceeding to the following step (i) if a value of the difference is within the set maximum allowable error value of the CMOS R.T.C.'s periodic interrupt frequency "p", or giving an interval timer abnormal signal and then proceeding to the following step (j) if the value of the difference is beyond the set maximum allowable error value of the CMOS R.T.C.'s periodic interrupt frequency "p".

2. The PC interval timer test method of claim 1 wherein the difference between the number of CMOS periodic interrupts and the number of interval timer interrupts is obtained by: calculating a difference between a result obtained by dividing the number of times "m" the CMOS periodic interrupt is detected by the set CMOS periodic interrupt frequency "x" (i.e., m/x), and a result obtained by dividing the total number "n" of the interval timer interrupts by an original interval timer interrupt frequency of 18.2 Hz (i.e., n/18.2).

3. The PC interval timer test method of claim 1 wherein said CMOS periodic interrupt frequency "x" is 8192 Hz.

4. The PC interval timer test method of claim 1 wherein said personal computer is an IBM compatible personal computer.

* * * * *